Jan. 12, 1943. C. A. PAYNE 2,307,947
ABSORPTION REFRIGERATING MACHINE
Filed May 12, 1942 3 Sheets-Sheet 1

Inventor
CHARLES ALFRED PAYNE
BY: Francis E. Boyce
ATTORNEY

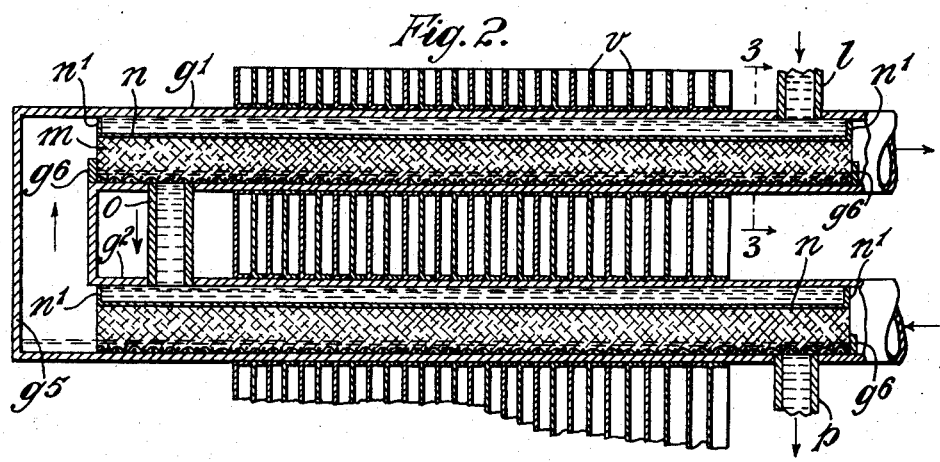
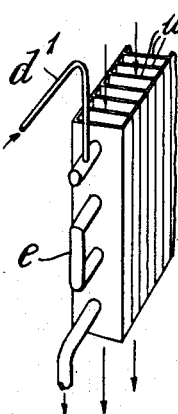
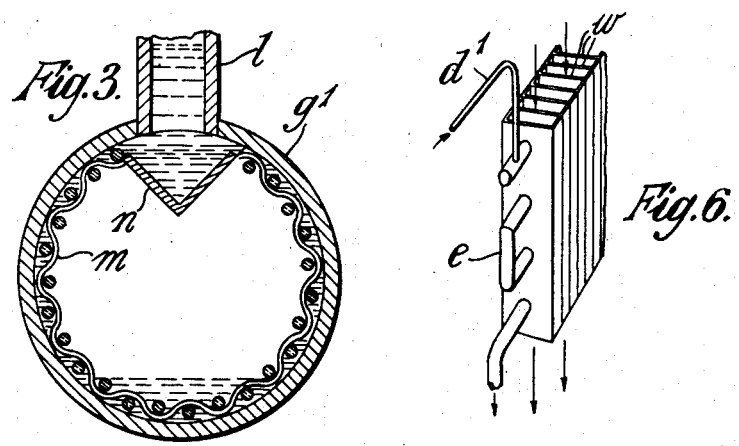
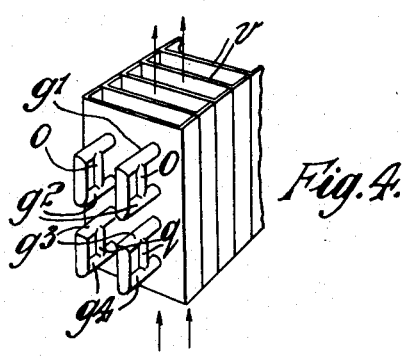

Jan. 12, 1943.   C. A. PAYNE   2,307,947
ABSORPTION REFRIGERATING MACHINE
Filed May 12, 1942   3 Sheets-Sheet 3

Inventor
CHARLES ALFRED PAYNE
BY: Francis E. Boyce
ATTORNEY

Patented Jan. 12, 1943

2,307,947

UNITED STATES PATENT OFFICE 2,307,947

ABSORPTION REFRIGERATING MACHINE

Charles Alfred Payne, Ilford, England

Application May 12, 1942, Serial No. 442,596
In Great Britain May 12, 1941

4 Claims. (Cl. 62—119.5)

This invention relates to continuous absorption refrigerating machines, and its ultimate object is to provide an absorption refrigerating machine which will operate effectively on a vehicle, whether road or rail vehicle, and on a ship, notwithstanding the rocking or other oscillation to which the machine may therefore be subjected.

To effect efficient absorption of vaporised refrigerant in the absorption liquid of an absorption refrigerating machine, it is desirable that the surface of the liquid exposed to the vaporized refrigerant shall be large relatively to the volume of such liquid, and also that the latent heat rendered sensible by the absorption shall be readily extracted from the absorption liquid. For this purpose absorbers have been used consisting of a vessel wherein the absorption liquid, in dripping through an atmosphere of or containing vaporized refrigerant, falls on to and flows as a thin film around an upright pipe coil traversed by a cooling fluid. Thus the thin film of liquid provides a large surface exposed to the vaporized refrigerant and also, by virtue of its thinness, a short and therefore ready path for the flow of heat to the cooling fluid. The efficient working of such an absorber depends upon the liquid falling on to the pipe coil and the pipe coil being maintained upright so that the liquid passes down over the successive coils thereof. This condition cannot be maintained on a moving vehicle or ship.

It has already been proposed to line tubular absorbers of absorption refrigerating machines, with a durable liquid-retaining lining, for instance of wire gauze, contacted by the absorption liquid and intended to increase the exposed surface of the latter. This has also been proposed for tubular evaporators, with the intention of increasing the exposed surface of the liquid refrigerant.

In the absorption refrigerating machine of the present invention, the absorber is also tubular and lined with a durable liquid-retaining lining, for instance of wire gauze, as is preferably also the evaporator.

According to the present invention, to provide an absorber for a continuous absorption refrigerating machine effective on a moving vehicle or ship, the absorber comprises a normally horizontal tube with a durable liquid-retaining lining, such as of wire gauze, in contact with the inner surface of the tube, an inlet for refrigerant vapour to the interior of the tube, means for admitting weak absorption liquor into the interior of the tube and supplying such liquor along the top or crest of the liquid-retaining lining, an outlet for rich liquor at the bottom or trough of the tube, and means for cooling the tube externally. As usually a tubular absorber consisting of a single long tube would be of inordinate length, the absorber, or each of a plurality of sections thereof connected in parallel, consists of a serpentine of superposed horizontal tubes interconnected at alternate ends by elbows, with the liquor outlet of the tube next above connected to the liquor inlet of the tube next beneath.

The external means for cooling the absorber conveniently may consist of air-swept radiator gills.

Instead of cooling the absorber externally by means of air-swept gills, a water jacket may be provided, which may be constituted by a tank in which the absorber is immersed.

The absorber may be an absorber for an ordinary absorption refrigerating machine, or an absorber for a diffusion absorption refrigerating machine wherein the pressures are entirely or partly equalised by the presence of an inert gas into which the refrigerant evaporates and from which it absorbs refrigerant vapour under the partial pressure of the refrigerant.

The evaporator can be of similar construction to the above described absorber, liquid refrigerant being admitted, instead of weak liquor, and supplied along the top or crest of the liquid-retaining lining of each evaporator tube.

Representative examples of absorbers and evaporators according to the invention in association with correlated elements of absorption refrigerating machines, are illustrated, somewhat diagrammatically, on the accompanying drawings, in which—

Fig. 2 is a sectional elevation on a larger scale of a portion of the absorber thereof.

Fig. 3 is a cross section on the line 3—3 of Fig. 2 on a still larger scale, and Fig. 4 is a broken perspective view of one end of the absorber on a slightly smaller scale than Fig. 1.

Fig. 6 is a broken perspective view of one end of the evaporator thereof on a slightly smaller scale.

Figure 1:
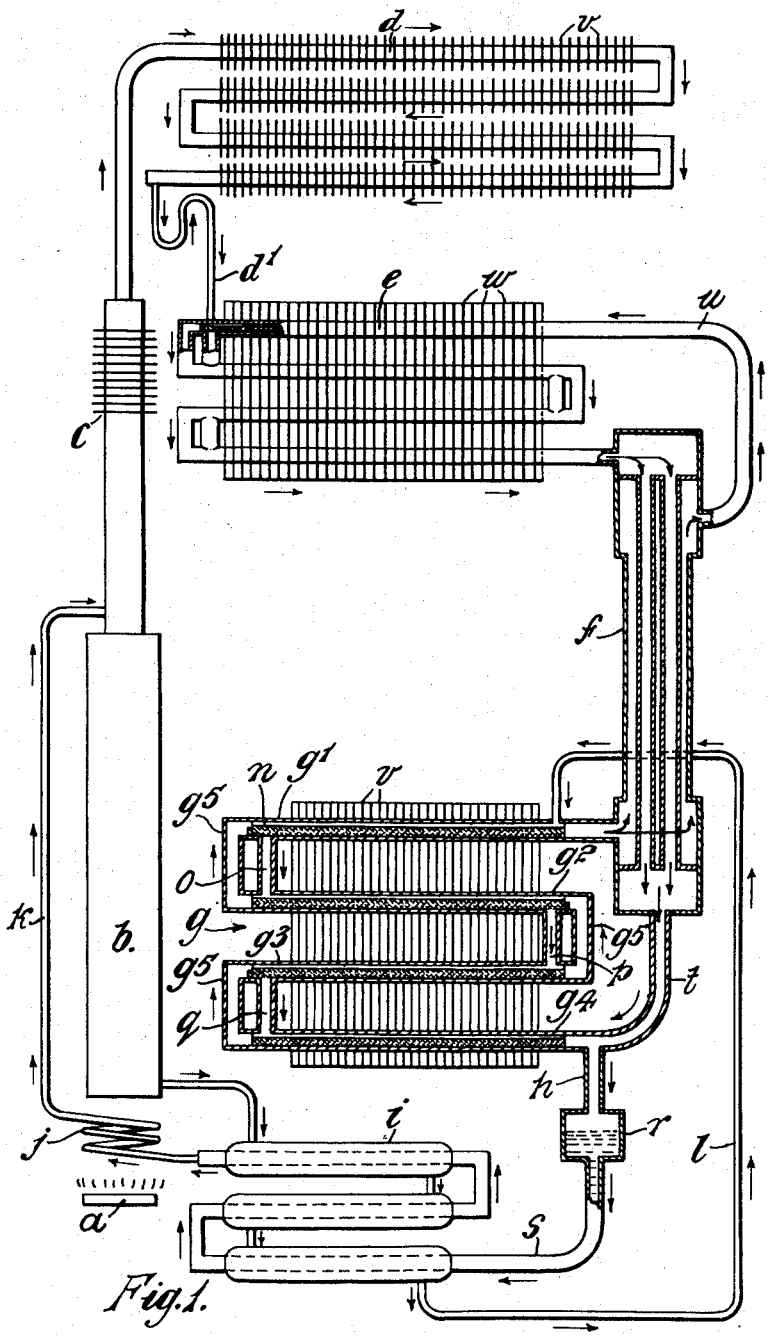
Fig. 1 is a diagrammatic sectional elevation of a diffusion absorption refrigerating machine.

Fig. 1 shows the invention applied to a diffusion absorption refrigerating machine, i. e., a continuous absorption refrigerating machine of the kind in which the refrigerant, for instance ammonia, evaporates under its own partial pressure into, and is absorbed from, an atmosphere of inert gas, for instance hydrogen, whereby the total pressure throughout the machine is maintained substantially uniform. This machine, as usual, comprises a gas burner $a$, which heats a boiler or generator $b$, in which vaporized refrigerant is driven off by heat from absorption liquor, for instance aqua ammonia, in which it has been absorbed. The vaporized refrigerant passes up an air-cooled rectifier $c$, wherein any vaporized absorption liquid, carried with the refrigerant vapour, is condensed and flows back into the boiler $b$. From the rectifier $c$ the vaporized refrigerant passes into an air-cooled condenser $d$, wherein it is condensed to the liquid state. From the condenser $d$ the liquid refrigerant flows into an evaporator $e$, wherein it evaporates under its own partial pressure into an atmosphere of inert gas, and produces cold. From the bottom of the evaporator $e$, a combined stream of vaporized refrigerant diffused in inert gas passes through a gas heat exchanger $f$ and thence into the bottom of an absorber $g$, wherein the vaporized refrigerant is absorbed, by weak absorption liquor, from the accompanying inert gas. The inert gas returns from the top of the absorber $g$, through the heat exchanger $f$, to the top of the evaporator $e$.

The absorption liquor enriched with absorbed refrigerant vapour, flows by a pipe $h$ from the bottom of the absorber $g$, through a liquor heat exchanger $i$, to a pipe coil $j$ subjected to the heat from the gas burner $a$, whereby, in the usual manner, bubbles of vapour are formed in the liquor, causing it to ascend a pipe $k$, which delivers it into the top of the boiler $b$. Weak liquor flows from the bottom of the boiler $b$, through the heat exchanger $i$ and thence is delivered by a pipe $l$ into the top of the absorber $g$.

The invention is concerned with the construction of the absorber $g$ and evaporator $e$.

As shown in Figs. 2, 3 and 4, the absorber $g$ consists of banks, connected in parallel, of superposed normally horizontal tubes $g^1$, $g^2$, $g^3$, $g^4$, each having a durable liquid-retaining lining $m$ of wire gauze in contact with the inner surface of the tube. A trough $n$ extends along the underside of the crest of each tube with its longitudinal borders projecting over the borders of a gap in the wire gauze lining $m$. The trough $n$ terminates short of the ends of the tube where each end of the trough $n$ is closed by a transverse dam $n^1$. Weak absorption liquor admitted by the pipe $l$ flows into the troughs $n$ of the uppermost tubes $g^1$, and, overflowing the longitudinal borders of the troughs $n$, flows down the wire gauze lining $m$. From the uppermost tubes $g^1$, the absorption liquor flows by pipes $o$, at the opposite end to the pipe $l$, into the troughs $n$ of the next lower tubes $g^2$. From the tubes $g^2$ the liquor flows into the troughs $n$ of the tubes $g^3$, by pipes $p$, and from the tubes $g^3$ by pipes $q$. The liquor flows from the lowermost tubes $g^4$ towards the heat exchanger $i$, by the pipes $h$, which unite in a sump vessel $r$ connected by a pipe $s$ to this heat exchanger $i$.

The tubes $g^4$, $g^3$, $g^2$, $g^1$ are also interconnected at alternate ends, by elbows $g^5$, so that vaporized refrigerant and inert gas admitted by pipes $t$ to one end of the lowermost tubes $g^4$, after having traversed the gas heat exchanger $f$, ascend and traverse the tubes in contra-flow with the descending liquor, during which vaporized refrigerant is absorbed by the liquor from the inert gas. The inert gas returns from the topmost tubes $g^1$ to the gas heat exchanger $f$.

Dams $g^6$ at the ends of the tubes prevent absorption liquor spilling down the elbows $g^5$.

Although the absorber $g$ is shown as having two banks of tubes connected in parallel, obviously and dependent upon the capacity of the machine, the absorber $g$ may consist of a single bank of horizontal tubes, or of more than two banks of horizontal tubes connected in parallel.

The evaporator $e$ is of similar construction to the absorber $g$, inasmuch as it consists of superposed normally horizontal tubes lined with metal gauze, with a trough along the crest of each tube, into which troughs, being in an evaporator, liquid refrigerant flows. The liquid refrigerant flows from the condenser $d$ into the trough of the topmost tube of the evaporator $e$ through a trapped pipe $d^1$. The inert gas flowing from the gas heat exchanger $f$, however, is connected by a pipe $u$, to the topmost tube and leaves the lowermost tube and flows into the gas heat exchanger $f$.

The condenser $d$ and absorber $g$ are air-cooled, and for this purpose are provided with external radiator gills $v$. The evaporator $e$ is also shown as provided with radiator gills $w$. These gills $v$ and $w$ can be formed of sheets of sheet metal apertured at intervals along vertical and horizontal rows to fit over the tubes of all the banks of tubes of the absorber or evaporator, as shown in Fig. 4 in respect of the absorber. Also as shown in Fig. 4 and also in Fig. 5 in respect of the evaporator $e$, the vertical borders of the gill sheets $v$, $w$ can be bent to form flanges spacing the sheets apart and defining vertical flues inducing a chimney draught of cooling air or a down draught of cold air as the case may be, through the so-formed block of gills.

Figure 5:
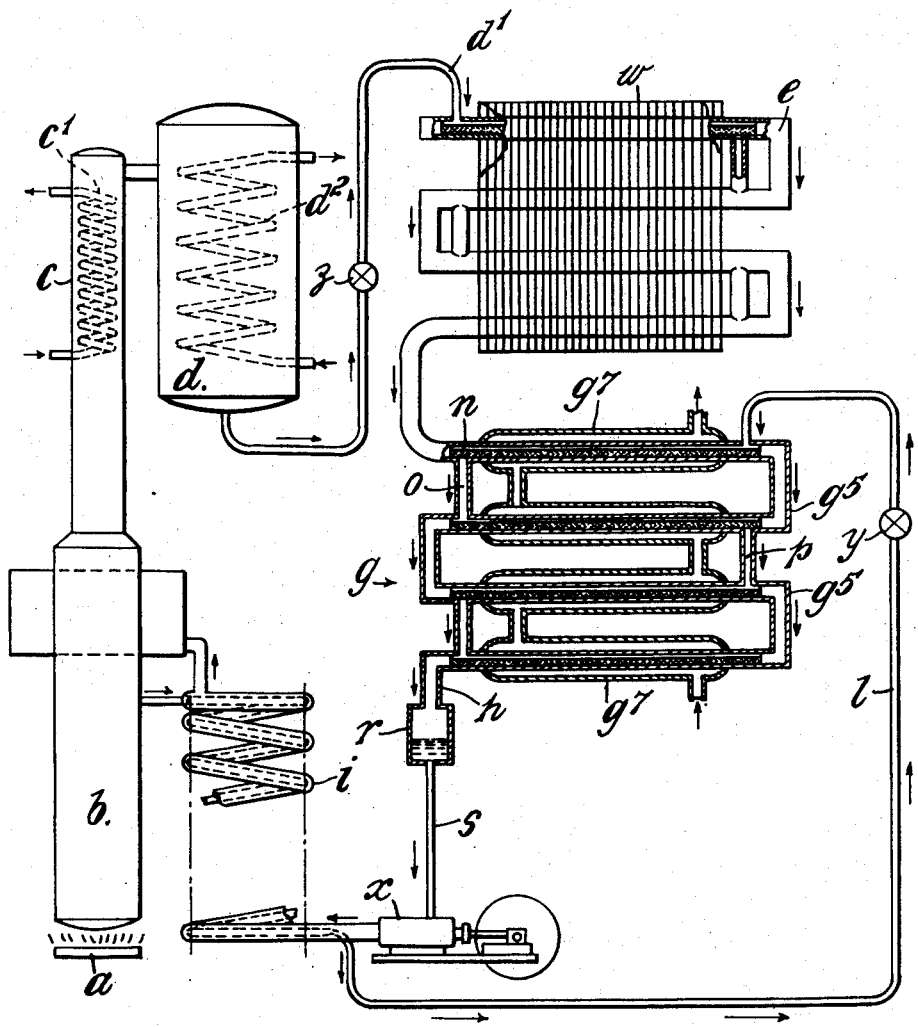
Fig. 5 is a diagrammatic sectional elevation of a conventional absorption refrigerating machine.

Fig. 5 shows an ordinary continuous absorption refrigerating machine having an evaporator $e$ and an absorber $g$ internally constructed and arranged as above described. As there is no inert gas circuit to equalise the pressure throughout the machine, there is no gas heat exchanger and a pump $x$ is provided to force the strong absorption liquor into the boiler $b$ and a throttle valve $y$ is provided in the weak liquor pipe. Also an expansion valve $z$ is provided between the condenser $d$ and the evaporator $e$. The rectifier $c$, condenser $d$ and absorber $g$ are illustrated as being cooled by water flowing through cooling coils $c^1$ and $d^2$ respectively and cooling jackets $g^7$.

I claim:

1. In a continuous absorption refrigerating machine an absorber comprising a normally horizontal tube having an inlet for refrigerant vapour and a bottom outlet for rich absorption liquor, a durable liquid-retaining lining in contact with the inner surface of said tube, means for admitting weak absorption liquor into said tube and supplying said liquor along the crest of said liquid-retaining lining, and means for cooling said tube.

2. In a continuous absorption refrigerating machine, an absorber comprising a normally horizontal tube having an inlet for refrigerant vapour and a bottom outlet for rich absorption liquor, a wire gauze lining in contact with the iner surface of said tube, a closed ended trough extending along the underside of the crest of said tube and with its longitudinal borders projecting over the borders of a gap in said wire gauze lining, said tube also having an inlet for weak absorption liquor to said trough, and means for cooling said tube.

3. In a continuous absorption refrigerating machine, an evaporator comprising a normally horizontal tube having an outlet for evaporated refrigerant, a durable liquid-retaining lining in contact with the inner surface of said tube, and means for admitting liquid refrigerant into said tube and supplying said liquid refrigerant along the crest of said liquid-retaining lining.

4. In a continuous absorption refrigerating machine, an evaporator comprising a normally horizontal tube having an outlet for evaporated refrigerant, a wire gauze lining in contact with the inner surface of said tube, and a closed ended trough extending along the underside of the crest of said tube and with its longitudinal borders projecting over the borders of a gap in said wire gauze lining, said tube also having an inlet for liquid refrigerant to said trough.

CHARLES ALFRED PAYNE.